Figure 1:
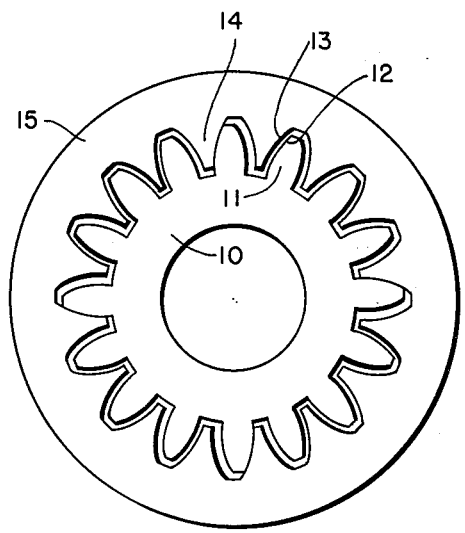

June 6, 1961 R. B. FEHR 2,986,856
GEAR FINISHING METHOD
Filed Aug. 13, 1958

INVENTOR.
ROY B. FEHR
BY Evans & Pearne
ATTORNEYS

United States Patent Office 2,986,856
Patented June 6, 1961

2,986,856
GEAR FINISHING METHOD
Roy B. Fehr, 704 Forestdale Road, Royal Oak, Mich.
Filed Aug. 13, 1958, Ser. No. 754,798
5 Claims. (Cl. 51—287)

The present invention relates to a method for finishing gears and gearlike articles of both the internal and external types, and it is applicable both to spur gears having a 0° helix angle and to spur gears having a helix angle greater than 0°. The latter are commonly referred to as helical gears.

An object of the present invention is to provide a process for manufacturing gears in quantity so that not only is tooth spacing of the gears correct and not only are the tooth profiles of each gear uniformly equalized but also a desired tooth profile shape, which has been accurately predetermined, is constantly maintained during the manufacture of the large quantity of gears.

The correction of tooth spacing and a high degree of uniformity between the tooth profiles of each gear have been previously attained by the methods shown in, for example, U.S. Patents Re. 17,884 and 1,881,382 in which an internal or external gear is corrected by a tool which is complementary to the gear. However, no one has successfully achieved a high degree of uniformity of tooth profile from gear to gear during long production runs by means which achieve extremely high standards of accuracy or which achieve interchangeability of gears in high standard applications as, for example, in 0° helix angle spur gears for aircraft use. High-accuracy applications of 0° helix angle spur gears are particularly exacting because in gears of this type the degree of overlap between engaging gears is critical within narrow limits and consequently suitably "modified" or "relieved" tooth profiles must be accurately maintained over production runs of gears. It will be understood that in this respect the invention is presently particularly advantageous, but that a high degree of profile uniformity from gear to gear may also be advantageous in spur gears having more than 0° helix angle.

Gears meeting the high standards required in the applications referred to above are presently manufactured by performing numerous passes over the toothed gear blank after hardening or heat treatment, with a grinding member such as a form grinding wheel or a generating grinding wheel, using procedures and apparatus well known in the art and discussed, for example, in Practical Gear Design by Darle W. Dudley, published by McGraw Hill Book Co. in 1954, pp. 213 ff.

The present invention involves the concept of reorganizing certain aspects of the operations of (a) grinding, lapping, honing, shaving or the like, and of (b) correcting, into a succession of steps in such a way as to augment the advantages inherent in each step and minimize their respective disadvantages. As used in this discussion the term "correcting" refers to the relative axial reciprocation of a toothed gear blank with respect to an abrasive matrix member in the form of a complementary spur gear, as shown for example in the patents referred to above.

Figure 2:
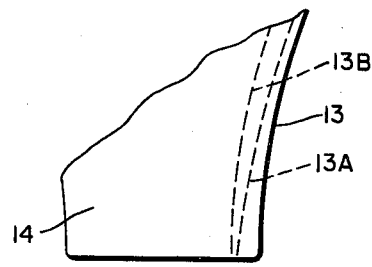
Figure 3:
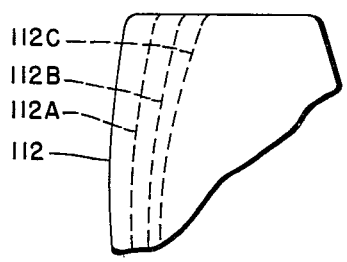
Figure 4:
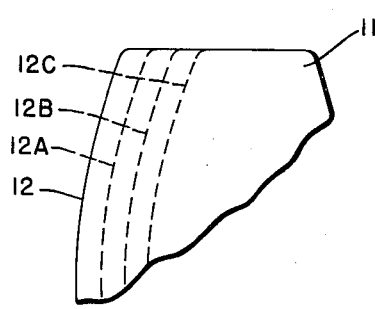

In the accompanying drawings:
FIGURE 1 is a diagrammatic view of a gear blank and of a coacting matrix member, illustrative of certain aspects of the invention.
FIGURE 2 is an enlarged fragmentary diagrammatic view of one of the teeth of the matrix member shown in FIGURE 1, illustrative of certain aspects of the invention.
FIGURE 3 is an enlarged fragmentary diagrammatic view of one of the teeth of a gear blank similar to the gear blank shown in FIGURE 1.
FIGURE 4 is an enlarged diagrammatic view of one of the teeth of the gear blank shown in FIGURE 1, illustrative of certain aspects of the invention.

In FIGURE 1 there is shown a toothed spur gear blank 10 which has teeth 11 formed thereon. There is also shown a matrix member 15 in the form of an internal spur gear having teeth 14. Each of the gear blank teeth 11 has a face 12 which is intended to be engaged by a corresponding face 13 of each of the matrix teeth 14. During the abrading of the gear blank 10 by the matrix member 15 by procedures which have been proposed for many years, the matrix 15 and the toothed gear blank 10 are axially reciprocated with respect to each other while torque pressure is applied between them to urge together the tooth faces 12 and 13. The registration between the teeth 11 and 14 is progressively changed. By this method the blank tooth faces 12 are angularly displaced with respect to each other toward a condition of uniform angular spacing and the profiles of all the teeth 11 are equalized.

Shown in FIGURE 2 is one of the teeth 14 of the matrix member 15. It is assumed in FIGURE 2 that the face 13 of the tooth 14 initially conforms with perfect accuracy to the desired tooth profile shape of the gears to be formed.

Shown in FIGURE 3 is the tooth of a gear blank similar to the tooth 11 but initially formed with a face 112 which does not accurately conform with the desired tooth profile shown at 112C. It will be understood that the gear blanks contemplated by the invention have been hobbed or shaped to roughed out form and have been deburred and chamfered and then heat treated to be hardened and tempered—all according to conventional practice. Accordingly, other teeth having tooth faces corresponding to the face 112 may have other types of irregularities. It will be assumed that the irregularities of the face 112 are a composite of the irregularities of a number of similar faces.

If the gear blank on which is formed the face 112 and other corresponding faces is corrected in the matrix 15 according to known practice, there will be achieved a uniformity of profile and uniformity of spacing of the faces of the gear teeth, all as described, for example, in U.S. Patent 1,881,382. As the face 112 is abraded by sliding contact with the several faces 13, it will successively assume the shapes 112A—112C respectively. The final face 112C may be very close to a predetermined desired final profile as determined by the faces 13 on the teeth 14 and in fact it may be within tolerance limits. This may also be true of the face at intermediate stages, such as for example at stage 112B. This may hold true for several gears or even a run of a relatively low number of gears assuming that the matrix member 15 is much harder than the gear blank 11. If it is not appreciably harder, even the abrading of the first one or the first several gears will result in the profile 112C being other than the desired final profile.

In all the above cases, the final profile 112C is uniform from tooth to tooth in each gear. However, this final profile 112C changes from gear to gear because of the wear of the matrix tooth 14 which wear is relatively slow or rapid according to the relative hardness or softness of the matrix member 15. Thus, as shown in FIGURE 2, the face 13, which initially is assumed to have been given a profile of ideal accuracy, is gradually or rapidly modified to a profile 13A which is an inaccurate profile. This wear is caused by the contact with the assumed initial composite profile face 112 of the teeth of numerous spur gear blanks.

Accordingly, it will be apparent that the methods of the prior art relating to relative axial reciprocation of a gear blank with respect to an abrasive matrix member in the form of a complementary spur gear, while achieving uniformity of tooth spacing and uniformity of profile in a given gear, fail to maintain in production that uniformity of profile from gear to gear which makes possible the manufacture on a production basis of gears which require a high degree of accuracy in profile shape.

According to the present invention, prior to the steps of relatively axially reciprocating the gear blank with respect to its abrasive matrix member and progressively changing registration between them, there is introduced the step of accurately conforming the faces of the tooth 11 of the spur gear blank to the desired profile shape. This may be accomplished by conventional operations such as grinding, lapping, honing, shaving or the like. For example, grinding may be used and there may be employed conventional grinding members, such as a form grinding wheel or a generating grinding wheel, using the conventional procedures well known in the art (and discussed, for example, in "Practical Gear Design," supra) but with a greatly reduced removal of material and a greatly reduced number of grinding passes since it is only necessary to conform each gear tooth 11 to the desired profile shape on a tooth-by-tooth basis without removing all the material necessary to assure equal spacing of the teeth. Thus, for example, the tooth 11 shown in FIGURE 4 is provided with a face 12 which is conformed to the desired profile face within the same tolerances as is the face 13 of each matrix tooth 14. When the spur gear blank 10 and matrix member 15 are axially reciprocated and progressively changed in registration, the profile face 12 of each tooth 11 is angularly displaced with respect to the other similar faces 12 toward a condition of uniform angular spacing around the pitch circle of the gear 10. If the face 12 is ground down in this operation, it assumes the profiles 12A, 12B and 12C, respectively. Each of these profiles is the shape of the desired tooth profile. Thus, it will be seen that the desired profile shape of each blank tooth face 12 obtains and is maintained at each and all of the successive stages 12A, 12B and 12C which are reached as there occurs angular displacement of the blank tooth faces 12 with respect to each other. This is to be contrasted with the most ideal and favorable circumstance of operation of the prior art in which there may be assumed a perfectly formed matrix member which is extremely hard. Even in such a case it will be noted that, as illustrated in FIGURE 3, during at least initial angular displacement of the blank tooth face 112 with respect to the corresponding face of other gear teeth, as for example between the stages 112 and 112A, the desired profile shape is not maintained because it does not obtain at the instant of initial abrading contact with the inaccurate face 112.

The inevitable result of the present invention is that there is maintained a sustained accuracy of profile of the finished tooth faces (faces 12C) of successive blanks, as shown in FIGURE 4, and also a sustained accuracy of profile of the matrix member tooth faces 13. The face 13 will wear, but when it does, it will continue to assume the correct profile form as illustrated at 13B in FIGURE 2.

Conventional or known apparatus, such as for example the apparatus shown in the above-mentioned patents, may be employed to perform the gear correcting steps involving the relative axial reciprocation of the gear blank with respect to the abrasive matrix member. As previously mentioned, gears having having a helix angle of more than 0° may be finished according to the methods of the present invention, the grinding steps being performed, for example, in the conventional grinding apparatus discussed in "Practical Gear Design," supra, and the correcting steps being performed in known apparatus of the type shown, for example, in the above-mentioned patents, the apparatus being suitably modified to provide a helical motion, as for example in the modification of FIGURE 1A in Re. 17,884. In all cases it will be understood that relative axial reciprocation is involved. In the case of gears having a helix angle of more than 0°, a helical motion is, of course, employed. An important component of such helical motion is the relative axial reciprocation between the parts.

The matrix member 15 must be accurately formed as to profile. It need not have great accuracy in spacing between the faces of the gear teeth as this will be automatically taken care of by the correcting steps performed, for example, on the apparatus of U.S. Patent 1,985,213. However in general, the more accurate the initial spacing between the tooth faces on the matrix member, the more efficient will be the actual manufacturing process.

In most cases it will be desirable to accurately finish both faces of each gear tooth and it will be understood that it may, therefore, be desirable to use both sides of the matrix teeth as operative faces and to correspondingly form both sides of the gear teeth by the steps contemplated in the present process. It will thus be understood that during the finishing steps torque may be applied successively in each rotative direction during relative axial reciprocation of the gear blank and the matrix. Also, it may be desirable to finish a gear on both sides with a matrix having teeth finished only on one side by finishing first sides of the gear teeth and then turning the gear over in order to finish the second sides of its teeth.

In many applications, the step of progressively changing the registration between the matrix member and the toothed gear blank is essential for acceptable accuracy. However, in some aspects the invention contemplates the elimination of this step. For example, in commercial production a long succession of toothed blanks may themselves perform the same function with respect to the matrix member as does progressive change of registration.

The matrix member 15 may be formed of a suitable plastic which is preferably capable of being molded, pressed or otherwise formed around an accurate model at relatively low temperatures such as 400° F. Among the suitable plastic materials would be, for example, epoxy resins, phenolic resins, or a phenolic resin having a glass fiber and having the following properties:

| | |
|---|---:|
| Specific gravity | 1.90 |
| Water absorption | 1.0% |
| Flexural p.s.i. | 22,000 |

A molding composition fulfilling these specifications is presently being marketed by Hooker Electrochemical Company as "Durez 16221." A mineral filled epoxy resin presently being marketed by Hooker Electrochemical Company as "Durez 16090" is also acceptable. A suitable epoxy resin is presently being marketed by the Bakelite Company as "C-8" epoxy resin.

While the above materials presently appear to be preferable, it will be understood that any material which has appropriate properties may be used to make matrix member 15.

As previously mentioned, the matrix member may be impregnated with an abrasive or a flowing abrasive compound may be separately provided. In the latter event, a suitable conventional lapping compound may be employed.

As mentioned above, the present invention involves the concept of reorganizing certain aspects of the operations of (a) grinding, lapping, honing, shaving, or the like, and of (b) correcting, into a novel succession of steps in such a way as to augment the advantages inherent in each step. It should be noted that in certain aspects the invention may also be advantageously practiced by utilizing gear materials which may be non-metallic or relatively soft metallic materials, in which case, conventional cutting operations, such as hobbing, shaping, milling, and the like, may be included with those listed under (a) above, and may be employed in the tooth face conforming step introduced according to the present invention.

Although the present invention has been described with reference to particular details by way of presently

What is claimed is:

1. In a process of finishing a toothed spur gear blank of hardened metal which includes the steps of providing an abrading matrix member in the form of a complementary spur gear having teeth each of which accurately conforms on a face with the desired tooth profile shape, and registering the spur gear blank and the matrix member and axially reciprocating the one with respect to the other while applying torque between them to angularly urge together said matrix tooth faces and corresponding blank tooth faces, whereby the blank tooth faces are angularly displaced with respect to each other toward a condition of uniform angular spacing, the introduction of the step of grinding the teeth of the blank only sufficiently to accurately conform a face of each of them to the desired profile shape and insufficiently to equally angularly space said faces each from the other, said introduced step occurring prior to the step of relatively axially reciprocating, to thereby cause the desired profile shape of said blank tooth faces to obtain during initial as well as final angular displacement of the blank tooth faces with respect to each other during said final steps, whereby as said process is repeated for successive spur gear blanks there is maintained a sustained accuracy of profile of the finished tooth faces of the successive blanks and a sustained accuracy of profile of the matrix tooth faces.

2. In a process of finishing a toothed spur gear blank of hardened metal which includes the steps of providing an abrading matrix member in the form of a complementary spur gear having teeth each of which conforms on a face with the desired tooth profile shape within given close tolerances, and registering the spur gear blank and the matrix member and axially reciprocating the one with respect to the other while applying torque between them angularly to urge together said matrix tooth faces and corresponding blank tooth faces, whereby the blank tooth faces are angularly displaced with respect to each other toward a condition of uniform angular spacing, the introduction of the step of grinding the teeth of the blank only sufficiently to conform a face of each of them to the desired profile shape within said given close tolerances and insufficiently to equally angularly space said faces each from the other, said introduced step occurring prior to the final step of relatively axially reciprocating, to thereby cause the desired profile shape of said blank tooth faces to obtain during initial as well as final angular displacement of the blank tooth faces with respect to each other during the final step, whereby as said process is repeated for successive spur gear blanks there is maintained a sustained accuracy of profile of the finished tooth faces of the successive blanks and a sustained accuracy of profile of the matrix tooth faces.

3. In a process of finishing a toothed spur gear blank of hardened metal which includes the steps of providing an abrading matrix member in the form of a complementary spur gear having teeth each of which conforms on a face with the desired tooth profile shape within given close tolerances, and registering the spur gear blank and the matrix member and axially reciprocating the one with respect to the other while applying torque between them to urge together said matrix tooth faces and corresponding blank tooth faces, whereby the blank tooth faces are angularly displaced with respect to each other toward a condition of uniform angular spacing, the introduction of the step of maintaining the desired profile shape of said blank tooth faces during initial as well as final angular displacement of the blank tooth faces with respect to each other during the final step by grinding a face of each tooth of the blank to the desired profile shape within said given close tolerances prior to contacting it with the matrix member, whereby as said process is repeated for successive spur gear blanks there is maintained a sustained accuracy of profile of the finished tooth faces of the successive blanks and a sustained accuracy of profile of the matrix tooth faces.

4. In a process of finishing a toothed spur gear blank of hardened metal which includes the steps of providing an abrading matrix member in the form of a complementary spur gear having teeth each of which accurately conforms on a face with the desired tooth profile shape, and registering the spur gear blank and the matrix member and axially reciprocating the one with respect to the other while applying torque between them to urge together said matrix tooth faces and corresponding blank tooth faces, whereby the blank tooth faces are angularly displaced with respect to each other toward a condition of uniform angular spacing, the introduction of the step of accurately conforming a face of each tooth of the blank to the desired profile shape prior to the final step of relatively axially reciprocating, to thereby maintain the desired profile shape of said blank tooth face during initial as well as final angular displacement of the blank tooth faces with respect to each other during said final step, whereby as said process is repeated for succesive spur gear blanks there is maintained a sustained accuracy of profile of the finished tooth faces of the successive blanks and a sustained accuracy of profile of the matrix tooth faces.

5. In a process of finishing a toothed spur gear blank which includes the steps of providing an abrading matrix member in the form of a complementary spur gear having teeth each of which accurately conforms on a face with the desired tooth profile shape, and registering the spur gear blank and the matrix member and axially reciprocating the one with respect to the other while applying torque between them to urge together said matrix tooth faces and corresponding blank tooth faces, whereby the blank tooth faces are angularly displaced with respect to each other toward a condition of uniform angular spacing, the introduction of the step of accurately conforming a face of each tooth of the blank to the desired profile shape prior to the final step of relatively axially reciprocating, to thereby maintain the desired profile shape of said blank tooth face during initial as well as final angular displacement of the blank tooth faces with respect to each other during said final step.

References Cited in the file of this patent

UNITED STATES PATENTS

| | | |
|---|---|---|
| 1,486,340 | Hoke | Mar. 11, 1924 |
| 1,870,764 | Aeppli | Aug. 9, 1932 |
| 1,881,392 | Wildhaber | Oct. 4, 1932 |